(12) United States Patent
Aso

(10) Patent No.: US 9,929,404 B2
(45) Date of Patent: Mar. 27, 2018

(54) NON-AQUEOUS ELECTROLYTE SECONDARY BATTERY

(71) Applicant: TOYOTA JIDOSHA KABUSHIKI KAISHA, Toyota-shi, Aichi-ken (JP)

(72) Inventor: Hikaru Aso, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 79 days.

(21) Appl. No.: 14/840,650

(22) Filed: Aug. 31, 2015

(65) Prior Publication Data

US 2016/0064733 A1    Mar. 3, 2016

(30) Foreign Application Priority Data

Sep. 2, 2014  (JP) ................................. 2014-178466

(51) Int. Cl.

| | | |
|---|---|---|
| *H01M 4/485* | (2010.01) | |
| *H01M 4/505* | (2010.01) | |
| *H01M 4/525* | (2010.01) | |
| *H01M 10/0525* | (2010.01) | |
| *H01M 4/36* | (2006.01) | |
| *C01G 33/00* | (2006.01) | |

(52) U.S. Cl.
CPC ............ *H01M 4/485* (2013.01); *C01G 33/00* (2013.01); *C01G 33/006* (2013.01); *H01M 4/366* (2013.01); *H01M 4/505* (2013.01); *H01M 4/525* (2013.01); *C01P 2002/72* (2013.01); *C01P 2002/76* (2013.01); *C01P 2002/85* (2013.01); *C01P 2004/03* (2013.01); *H01M 10/0525* (2013.01)

(58) Field of Classification Search
CPC ...... H01M 4/366; H01M 4/485; H01M 4/525; H01M 4/505; H01M 10/0525; C01G 33/006; C01G 33/00; C01P 2004/03; C01P 2002/72; C01P 2002/76; C01P 2002/85

See application file for complete search history.

(56) References Cited

U.S. PATENT DOCUMENTS

| | | | |
|---|---|---|---|
| 2009/0220862 A1 | 9/2009 | Toyama et al. | |
| 2012/0028128 A1* | 2/2012 | Seino ................. | C01G 45/1228 429/304 |
| 2012/0244432 A1 | 9/2012 | Park et al. | |
| 2015/0280210 A1* | 10/2015 | Yamamoto ............ | C01G 53/50 429/338 |

FOREIGN PATENT DOCUMENTS

| | | |
|---|---|---|
| JP | 2009-206047 A | 9/2009 |
| JP | 4954481 B2 | 6/2012 |
| KR | 10-2012-0095803 A | 8/2012 |
| WO | 2014058068 A1 | 4/2014 |

* cited by examiner

*Primary Examiner* — Muhammad S Siddiquee
(74) *Attorney, Agent, or Firm* — Sughrue Mion, PLLC

(57) ABSTRACT

A non-aqueous electrolyte secondary battery includes: a positive electrode containing a positive active material; a negative electrode; and a non-aqueous electrolyte. The positive active material contains composite oxide particles having a spinel structure including Ni and Mn. The composite oxide particles contain at least one of a crystal phase of $LiNbO_3$ and a crystal phase of $LiMg_{1-x}Nb_xO_3$. The "x" is higher than 0 and lower than 1. The crystal phase is segregated and located in a surface layer portion of the composite oxide particles.

14 Claims, 6 Drawing Sheets

EDS LAYER IMAGE 10

EDS LAYER IMAGE 3

NON-AQUEOUS ELECTROLYTE SECONDARY BATTERY

INCORPORATION BY REFERENCE

The disclosure of Japanese Patent Application No. 2014-178466 filed on Sep. 2, 2014 including the specification, drawings and abstract is incorporated herein by reference in its entirety.

BACKGROUND OF THE INVENTION

1. Field of the Invention

The present invention relates to a non-aqueous electrolyte secondary battery provided with a positive active material made of a composite oxide.

2. Description of Related Art

The importance of lithium-ion secondary batteries or other non-aqueous electrolyte secondary batteries as a power source mounted in a vehicle or a power source of a personal computer of a mobile terminal has increased. Particularly, a lithium-ion secondary battery capable of obtaining a high energy density at a low weight is preferably used as a high-output power source mounted in a vehicle. For such uses, a reduction in the size and weight of the battery is required, and an increase in the energy density of the battery has become an important technical object. In order to increase the energy density, increasing the operating voltage of a battery is effective.

Currently, as a positive active material included in a 4 V class lithium-ion secondary battery, a lithium manganese composite oxide ($LiMn_2O_4$) having a spinel structure or the like is used. When a positive active material having a higher potential is developed, a further increase in the energy of the lithium-ion secondary battery can be achieved. In order to achieve the increase in the density, a lithium nickel manganese composite oxide having a spinel structure in which a portion of manganese of $LiMn_2O_4$ is substituted with nickel is considered. Nickel contained in the nickel-containing composite oxide allows the lithium-ion secondary battery to operate in a voltage range of 4.5 V or higher. Therefore, the nickel-containing composite oxide is expected to be a positive active material capable of obtaining a high capacity and a high energy density.

In general, when the non-aqueous electrolyte secondary battery which uses the lithium nickel manganese composite oxide having a spinel structure as the positive active material undergoes repeated cycles, there is a possibility that Mn may elute from the positive active material. When Mn elutes from the positive active material, the deterioration of a negative active material or a non-aqueous electrolyte progresses due to the eluted Mn, and there is a possibility that the deterioration in the capacity thereof may occur.

SUMMARY OF THE INVENTION

The present invention provides a non-aqueous electrolyte secondary battery which reduces the elution of Mn.

A non-aqueous electrolyte secondary battery according to an aspect of the present invention includes: a positive electrode containing a positive active material; a negative electrode; and a non-aqueous electrolyte. The positive active material contains composite oxide particles having a spinel structure including Ni and Mn. The composite oxide particles contain at least one of a crystal phase of $LiNbO_3$ and a crystal phase of $LiMg_{1-x}Nb_xO_3$. The "x" is higher than 0 and lower than 1. The crystal phase is segregated and located in a surface layer portion of the composite oxide particles.

The crystal phase, which contains at least one of the crystal phase of $LiNbO_3$ and the crystal phase of $LiMg_{1-x}Nb_xO_3$ and is segregated and located in the surface layer portion, can prevent or reduce the elution of Mn from the positive active material. Therefore, for example, capacity deterioration after cycles occur is effectively improved.

In the aspect of the present invention, the spinel structure may include Ni, Mn, Nb, Mg, and Me. Me is at least one metal element having a lower electronegativity than an electronegativity of Mn. The composite oxide particles may primarily form the spinel structure.

In the configuration, the elution of Mn is effectively prevented or reduced, and thus excellent cycle characteristics are achieved.

In the above configuration, a combination of the spinel structure and the crystal phase may be expressed by General Formula (1) as follows:

$$LiNi_aMn_bNb_cMg_dMe_eO_4 \quad (1)$$

where a, b, c, d, and e in the General Formula (1) satisfy following conditions:

$0.4 \leq a \leq 0.6$ $1.2 \leq b \leq 1.6$ $0.02 \leq c \leq 0.1$ $0.02 \leq d \leq 0.1$ $0 \leq e \leq 0.1$ $1.8 \leq (a+b+c+d+e) \leq 2.2$.

When the composite oxide having the composition is used, the effects of the aspects of the present invention can be more reliably exhibited.

In the above configuration, Me may be at least one metal element selected from the group consisting of Na, K, and Ca.

In the above configuration, the "e" may be 0.03 or higher and 0.05 or lower.

In the aspect of the present invention, the crystal phase may contain $LiMg_{1-x}Nb_xO_3$.

Since $LiMg_{1-x}Nb_xO_3$ has a higher ionic conductivity than that of $LiNbO_3$, excellent battery performance (for example, cycle characteristics and output characteristics) can be achieved.

In the above configuration, the crystal phase may consist of $LiMg_{1-x}Nb_xO_3$.

In the above configuration, $LiMg_{1-x}Nb_xO_3$ may have a crystal structure of a trigonal crystal system that belongs to a space group R3C.

In the above configuration, the "x" may be higher than 0 and equal to or lower than 0.5.

In the above configuration, the "x" may be 0.001 or higher and 0.3 or lower.

In the above configuration, the "x" may be 0.005 or higher and 0.2 or lower.

In the above configuration, the "x" may be 0.01 or higher and 0.1 or lower.

In the aspect of the present invention, the crystal phase may be a film that is scattered in the surface layer portion of the composite oxide particles.

In the above configuration, the crystal phase may have a peak at a position shifted toward a lower angle side by 0.05° to 0.1° inclusive from a predetermined peak between 23.5° and 24.0° in an X-ray diffraction pattern measured by a powder X-ray diffraction analyzer, the predetermined peak being included among peaks attributed to the crystal phase of LiNbO$_3$.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
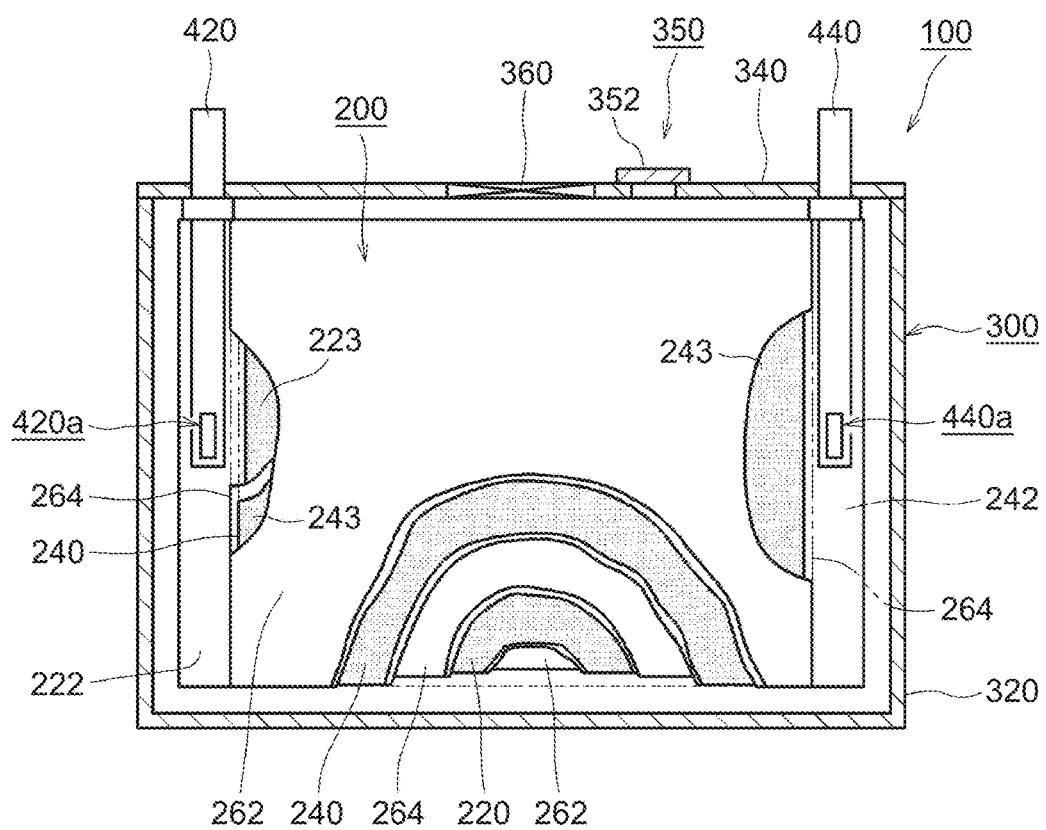
FIG. 1 is a sectional view of a lithium-ion secondary battery according to an embodiment of the present invention.

Hereinafter, exemplary embodiments of the present invention will be described with reference to the drawings. Each of the drawings is a schematic illustration and does not necessarily reflect real objects. Items which are not the items that are particularly mentioned in the specification and are necessary items for the implementation of the present invention can be appropriately changed on the basis of the related art in a corresponding field. In addition, the present invention can be implemented on the basis of the contents disclosed in the specification and general technical knowledge in the corresponding field. Hereinafter, an embodiment of the present invention will be described in more detail by using a lithium-ion secondary battery as an example. However, the application object of the present invention is not limited to the lithium-ion secondary battery.

In the embodiment of the present invention, a positive active material used in the lithium-ion secondary battery is made of composite oxide particles which are particles (typically secondary particles) made by gathering primary particles and have a spinel structure containing at least nickel (Ni) and manganese (Mn). The composite oxide particles contain at least one of primary particles and secondary particles, and preferably contain both. The composite oxide particles contain at least one of the crystal phase of LiNbO$_3$ and the crystal phase of LiMg$_{1-x}$Nb$_x$O$_3$ (0<x<1). The crystal phase is segregated and located in the surface layer portion of the composite oxide particles. That is, the surface layer portion of the composite oxide particles contains the crystal phase of LiNbO$_3$ and/or LiMg$_{1-x}$Nb$_x$O$_3$ while the composite oxide particles primarily form the spinel structure containing Ni and Mn. As the segregated crystal phase is located in the surface layer portion of the particles, for example, the elution of Mn from the positive active material is prevented, and thus the deterioration in the capacity after cycles of the battery occur can be effectively improved. It is preferable that such a crystal phase is, for example, scattered in a film shape in the surface layer portion of the composite oxide particles. According to this embodiment, an effect of improving cycle deterioration due to the presence of the crystal phase can be more efficiently exhibited.

In a preferable aspect, only a crystal phase of LiMg$_{1-x}$Nb$_x$O$_3$ (0<x<1) is contained as the crystal phase. Here, "x" in LiMg$_{1-x}$Nb$_x$O$_3$ is a value that represents the ratio of Nb substituted for Mg in the crystal structure (for example, the trigonal crystal system that belongs to the space group R3C) of LiNbO$_3$. The range that can be taken by x may be in a range of 0<x<1 as long as the crystal structure of LiNbO$_3$ can be maintained without breakage. That is, the composition ratio of Mg(1-x) and Nb(x) is appropriately selected depending on the object of this configuration, and for example, may satisfy 0<x≤0.5, preferably satisfies 0.001≤x≤0.3, more preferably satisfies 0.005≤x≤0.2, and particularly preferably satisfies 0.01≤x≤0.1. As described above, by substituting a portion of Nb of LiNbO$_3$ with Ni, the Li ionic conductivity of the crystal phase is enhanced. Therefore, excellent battery performance can be achieved. The "battery performance" may include at least one, and preferably all of battery capacity, cycle characteristics, and output characteristics. The composition ratio of Mg(1-x) and Nb(x) may be specified, for example, from a simulation of an X-ray diffraction pattern or crystal structure analysis.

The composite oxide particles can be checked by using an X-ray diffraction pattern measured by a powder X-ray diffraction analyzer (XRD). For example, in a case where the composite oxide particles contain the crystal phase of LiNbO$_3$, typically, in addition to peaks attributed to the spinel structure containing Ni and Mn, peaks attributed to the crystal phase of LiNbO$_3$ can be observed at positions at 2θ of about 23.5°, 32.8°, 34.8°, 42.5°, and 53.1°. That is, it can be confirmed by the peaks observed at positions at 2θ of about 23.5°, 32.8°, 34.8°, 42.5°, and 53.1° that the composite oxide particles contains the crystal phase of LiNbO$_3$. In addition, in a case where the composite oxide particles contain the crystal phase of LiMg$_{1-x}$Nb$_x$O$_3$ (0<x<1), typically, in addition to peaks attributed to the spinel structure containing Ni and Mn, peaks attributed to the crystal phase of LiMg$_{1-x}$Nb$_x$O$_3$ can be observed at positions shifted toward the lower angle side from the peaks attributed to the crystal phase of LiNbO$_3$ described above (for example, positions shifted toward the lower angle side by 0.05° to 0.1° inclusive). That is, it can be confirmed by the peaks observed at positions being shifted toward the lower angle side from the peaks attributed to the crystal phase of LiNbO$_3$ that the composite oxide particles contain the crystal phase of LiMg$_{1-x}$Nb$_x$O$_3$.

It can be recognized by Nb mapping, for example, through SEM (scanning electron microscope)-EDX (energy-dispersive x-ray spectroscopy) that the crystal phase is more segregated (typically scattered) and located in the surface layer portion of the composite oxide particles than at the center portion thereof.

A method to allow the crystal phase of LiNbO$_3$ or LiMg$_{1-x}$Nb$_x$O$_3$ to segregate to be located in the surface layer portion of the composite oxide particles primarily formed in the spinel structure is not particularly limited, and for example, a method of adding niobium (Nb) or magnesium (Mg) during the synthesis of the composite oxide may be employed. By adding Nb or Mg during the synthesis of the composite oxide, the composite oxide primarily formed in the spinel structure in which a portion of Mn is substituted with Nb or Mg is obtained, and $LiNbO_3$ or $LiMg_{1-x}Nb_xO_3$ can be crystallized in the surface layer portion of the composite oxide particles.

As an appropriate example of the composite oxide, a composite oxide of which the entire composition including the spinel structure and the crystal phase is expressed by General Formula (1) is employed.

$$LiNi_aMn_bNb_cMg_dMe_eO_4 \qquad (1)$$

where a, b, c, d, and e in Formula (1) satisfy the following conditions:

$$0.4 \leq a \leq 0.6$$

$$1.2 \leq b \leq 1.6$$

$$0.02 \leq c \leq 0.1$$

$$0.02 \leq d \leq 0.1$$

$$0 \leq e \leq 0.1$$

$$1.8 \leq (a+b+c+d+e) \leq 2.2$$

As described above, Me is not present or Me is at least one metal element having a lower electronegativity than that of Mn.

As shown in Formula (1), an appropriate composite oxide used here contains lithium (Li), nickel (Ni), manganese (Mn), niobium (Nb), and magnesium (Mg) as constituent elements. The composite oxide may contain at least one metal element Me in addition to Li, Ni, Mn, Nb, and Mg, that is, e may be greater than 0. In addition, the composite oxide may not contain Me, that is, e=0 may also be satisfied. The metal element Me may be typically one type or two or more types selected from metal elements (transition metal elements, typical metal elements, and the like) having a lower electronegativity than that of Mn. More specifically, calcium (Ca), strontium (Sr), sodium (Na), potassium (K), rubidium (Rb), titanium (Ti), zirconium (Zr), scandium (Sc), yttrium (Y), and the like may be employed, and for example, Ca, Na, and K may be preferably employed. The composition ratio (that is, the value of e in Formula (1)) of the element Me is not particularly limited, and for example, may satisfy $0 \leq e \leq 0.1$ (for example, $0 \leq e \leq 0.08$), and preferably satisfies $0.03 \leq e \leq 0.05$. In the composite oxide to which Me is added at the composition ratio, a portion of Mn is substituted with Me having a low electronegativity, and thus the spinel type crystal structure of the composite oxide is stabilized. Therefore, oxygen deficiency can be further prevented even during baking, which will be described later. In the specification, the "electronegativity" means "Pauling electronegativity".

In addition, "a" in Formula (1) is a value that substantially represents the ratio of Ni substituted for Mn in the spinel type crystal structure, and the range that can be taken by a may be appropriately selected as long as the spinel type crystal structure can be maintained without breakage. For example, a is 0.4 or higher (preferably 0.45 or higher and more preferably 0.475 or higher) and 0.6 or lower (preferably 0.55 or lower and more preferably 0.5 or lower). In the composite oxide to which Ni is added at the composition ratio, a portion of Mn is substituted with Ni, and thus the spinel type crystal structure of the composite oxide is stabilized. Therefore, the composite oxide can be preferably used in a voltage region (typically an average voltage of 4.5 V or higher) in which the positive electrode potential is 4.6 V or higher (in terms of lithium).

In addition, "c" in Formula (1) is the composition ratio of Nb in the composite oxide, and typically satisfies $0.02 \leq c \leq 0.1$, preferably satisfies $0.03 \leq c \leq 0.1$, and particularly preferably satisfies $0.05 \leq c \leq 0.1$. By substituting a portion of Mn with Nb, the spinel type crystal structure of the composite oxide to which Nb is added at the composition ratio is stabilized. Therefore, oxygen deficiency can be further prevented even during baking, which will be described later. In addition, an appropriate amount of $LiNbO_3$ or $LiMg_{1-x}Nb_xO_3$ can be crystallized in the surface layer portion of the composite oxide particles. When the value of c is too low, there may be cases where it becomes difficult to crystallize $LiNbO_3$ or $LiNi_{1-x}Nb_xO_3$ in the surface layer portion of the composite oxide particles. On the other hand, when the value of c is too high, there may be cases where the battery capacity tends to decrease.

In addition, "d" in Formula (1) is the composition ratio of Mg in the composite oxide, and typically satisfies $0.02 \leq d \leq 0.1$, preferably satisfies $0.03 \leq d \leq 0.1$, and particularly preferably satisfies $0.05 \leq d \leq 0.1$. By substituting a portion of Mn with Mg, the spinel type crystal structure of the composite oxide to which Mg is added at the composition ratio is stabilized. Therefore, oxygen deficiency can be further prevented even during baking, which will be described later. In addition, an appropriate amount of $LiMg_{1-x}Nb_xO_3$ can be crystallized in the surface layer portion of the composite oxide particles. When the value of d is too low, there may be cases where it becomes difficult to crystallize $LiMg_{1-x}Nb_xO_3$ in the surface layer portion of the composite oxide particles. On the other hand, when the value of d is too high, there may be cases where the battery capacity tends to decrease.

The composite oxide may be typically particles (secondary particles) made by gathering primary particles. The properties of the particles are not particularly limited, and for example, the average grain size of the primary particles based on SEM observation may be 1 μm or greater and 3 μm or smaller. In addition, the average grain size of the secondary particles based on SEM observation may be 5 μm or greater and 10 μm or smaller.

A method of manufacturing the composite oxide particles is not particularly limited, and for example, the composite oxide particles may be manufactured by obtaining a raw mixed liquid by mixing various types of starting raw materials in an aqueous solvent (mixing process), obtaining a gel-like precursor by heating the raw mixed liquid (gelation process), and baking the gel-like precursor (baking process). Hereinafter, the manufacturing method disclosed herein will be described by using a composite oxide of which the entire composition is expressed by General Formula (1): $LiNi_aMn_bNb_cMg_dMe_eO_4$ described above, as an example, and is not intended to limit the present invention to specific aspects.

In the mixing process, typically, as the staring raw materials, a lithium (Li) source, a nickel (Ni) source, a manganese (Mn) source, a niobium (Nb) source, a magnesium (Mg) source, and an Me element source are prepared, and these materials are mixed in the aqueous solvent, thereby obtaining the raw mixed liquid. The amounts of metal element sources (the Li source, the Ni source, the Mn source, the Nb source, the Mg source, and the Me source) in the raw mixed liquid may be appropriately determined so that the molar ratios of a, b, c, d, and e in General Formula (1) are satisfied. The raw mixed liquid can be prepared by dissolving predetermined amounts of the metal element sources (the Li source, the Ni source, the Mn source, the Nb source, the Mg source, and the Me source) in the aqueous solvent. The order in which the metal elements are added to the aqueous solvent is not particularly limited. In addition, anions of the metal element sources (the Li source, the Ni source, the Mn source, the Mg source, and the Me source) excluding the Nb source may be appropriately selected so that the metal element sources are water-soluble. For example, acetic acid ions, sulfuric acid ions, nitric acid ions, carbonic acid ions, hydroxide ions, and chloride ions may be employed. Among these, acetic acid ions are preferably used. The anions of the metal element sources may be the same, may be partially the same, or may be different from each other. In addition, the metal element sources may be in a solvated state such as the hydrates thereof.

As the Nb source, an inorganic niobium compound such as niobium oxide or an organic niobium compound such as niobium alkoxides (for example, pentaethoxyniobium (V)) and niobium chelates may be used. Here, the Nb source is one of the important factors from the viewpoint that any one of $LiNbO_3$ and $LiMg_{1-x}Nb_xO_3$ is selectively crystallized in the surface layer portion of the composite oxide particles. That is, in this configuration, by using the organic niobium compound such as pentaethoxyniobium (V) as the Nb source, $LiMg_{1-x}Nb_xO_3$ can be selectively crystallized in the surface layer portion of the composite oxide particles. In addition, by using the inorganic niobium compound such as niobium oxide as the Nb source, $LiNbO_3$ can be selectively crystallized in the surface layer portion of the composite oxide particles.

The aqueous solvent used to prepare the raw mixed liquid is typically water (pure water), and a mixed solvent primarily containing water may also be used. As a solvent other than water contained in the mixed solvent, one type or two or more types of organic solvents (for example, lower alcohols and lower ketones) that can be uniformly mixed with water can be appropriately selected and used. In addition, in a case where the raw material compound that is used has low water solubility or the like, a compound (acids, bases, or the like) or the like that can improve the water solubility may be appropriately added to the aqueous solvent.

Preferably, the raw mixed liquid may be adjusted to have acidity (pH<7). As a compound that can allow the raw mixed liquid to have acidity, an inorganic acid may be preferably used. For example, one type or two or more types selected from nitric acid ($HNO_3$), hydrochloric acid (HCl), sulfuric acid ($H_2SO_4$), perchloric acid ($HClO_4$), and the like may be used. Among these, nitric acid is preferably used. The compound is preferably added so that the pH of the raw mixed liquid is about $1 \leq pH \leq 3$ (for example, $1 \leq pH < 3$). By satisfying this range, the water solubility of the metal element sources can be enhanced, and the reaction rate thereof can be increased. In addition, in the specification, the pH value indicates a value measured at room temperature (a liquid temperature of 25° C.) by using a commercially available pH meter.

In the gelation process, the gel-like precursor is obtained by heating the raw mixed liquid (gelation process) while stirring the raw mixed liquid at an appropriate speed. The means for heating the raw mixed liquid is not particularly limited, and arbitrary means such as an oil bath may be employed. For example, the reaction time may be a period of time during which the starting raw materials are sufficiently diffused and permeated through the liquid phase and the generation of the gel-like precursor sufficiently proceeds, and for example, may be 8 hours or longer and 30 hours or shorter, and preferably 12 hours or longer and 24 hours or shorter. In addition, the reaction temperature may be a temperature (typically 50° C. to 100° C., for example, 70° C. to 90° C. (typically 80° C.)) equal to or lower than the boiling point of the aqueous solvent.

In the baking process, the composite oxide particles disclosed herein can be manufactured by baking the precursor. The baking process may be performed in the air or in an atmosphere which is richer in oxygen than the air. As a preferable aspect, the baking process including a first baking step of baking the precursor at a temperature T1 (that is, 200° C.$\leq$T1$\leq$400° C., for example, 200° C.$\leq$T1$\leq$300° C., typically 220° C.$\leq$T1$\leq$260° C.) of 200° C. or higher and 400° C. or lower and a second baking step of cooling and crushing the resultant subjected to the first baking step and thereafter baking the resultant at a temperature T2 (that is, 700° C.$\leq$T2$\leq$1000° C., for example 800° C.$\leq$T2$\leq$900° C.) of 700° C. or higher and 1000° C. or lower is performed. By baking the precursor according to the multiple-stage baking schedule, a desired composite oxide can be more efficiently formed.

In addition, the obtained baked material is typically crushed and is thereafter sieved into a desired grain size as necessary so as to be used as the positive active material. As described above, the composite oxide particles (the positive active material) which primarily have the spinel structure containing Mn, Ni, Nb, and Mg and have the crystal phase of $LiNbO_3$ or $LiMg_{1-x}Nb_xO_3$ segregated and located in the surface layer portion thereof can be manufactured.

The composite oxide particles (the positive active material) disclosed herein are widely applied to the lithium-ion secondary batteries and various other non-aqueous electrolyte secondary batteries and are useful for improving the performance of the batteries. For example, after cycles of the batteries occur, capacity deterioration can be effectively improved.

As the reason why the above effects are obtained, for example, the following reasons are considered to be responsible. In general, in a battery which uses the lithium nickel manganese composite oxide having the spinel structure as the positive active material, there is a possibility that Mn may be eluted from the positive active material. It is thought that the elution of Mn occurs because oxygen in the spinel lattice is deficient when the lithium nickel manganese composite oxide is baked during the manufacturing process and thus a portion of $Mn^{3+}$ becomes disproportionate and becomes $Mn^{2+}$, which is easily eluted. In addition, when cycles are repeated even after the battery is constructed, a portion of $Mn^{3+}$ becomes disproportionate due to the activation components contained in the non-aqueous electrolyte and becomes $Mn^{2+}$, which is easily eluted. For example, in a case where lithium hexafluorophosphate ($LiPF_6$) is used as the support salt of the non-aqueous electrolyte, an acid component such as hydrogen fluoride generated by the reaction of $LiPF_6$ and a small amount of moisture that is present in the non-aqueous electrolyte is regarded as the activation component. When Mn is eluted from the positive active material, deterioration in the negative active material and the non-aqueous electrolyte progresses due to the eluted Mn, which may act as the primary factor in capacity deterioration.

Contrary to this, the composite oxide particles disclosed herein contain the crystal phase of $LiNbO_3$ or $LiMg_{1-x}Nb_xO_3$ in the surface layer portion thereof while primarily forming the spinel structure containing Ni and Mn. Since the crystal phase is segregated and located in the surface layer portion of the composite oxide particles, the positive active material is protected from the activation components (for example, hydrogen fluoride) contained in the non-aqueous electrolyte. Therefore, even when cycles are repeated, Mn is less likely to become disproportionate. Furthermore, in this embodiment, since a portion of Mn in the spinel structure is substituted with Nb having a higher valence (typically a valence of 5) and a portion of Mn in the spinel structure is substituted with Mg having a low electronegativity, the bonding force of oxygen and transition metals is increased, and thus oxygen is less likely to become deficient in the spinel lattice during the above-described baking process. Therefore, together with the protection by the crystal phase, Mn can further be suppressed from becoming disproportionate. As a result, it is assumed that Mn is less likely to be eluted.

Hereinafter, the configurations of the lithium-ion secondary battery which uses the composite oxide particles (the positive active material) will be sequentially described. Here, a lithium-ion secondary battery in a form in which a wound type electrode assembly (hereinafter, referred to as "wound electrode assembly") and a non-aqueous electrolyte are accommodated in a square case (here, a box form in a rectangular parallelepiped shape) is exemplified. In addition, the battery structure thereof is not limited to the illustrated example, and is not particularly limited to the square battery.

Figure 2:
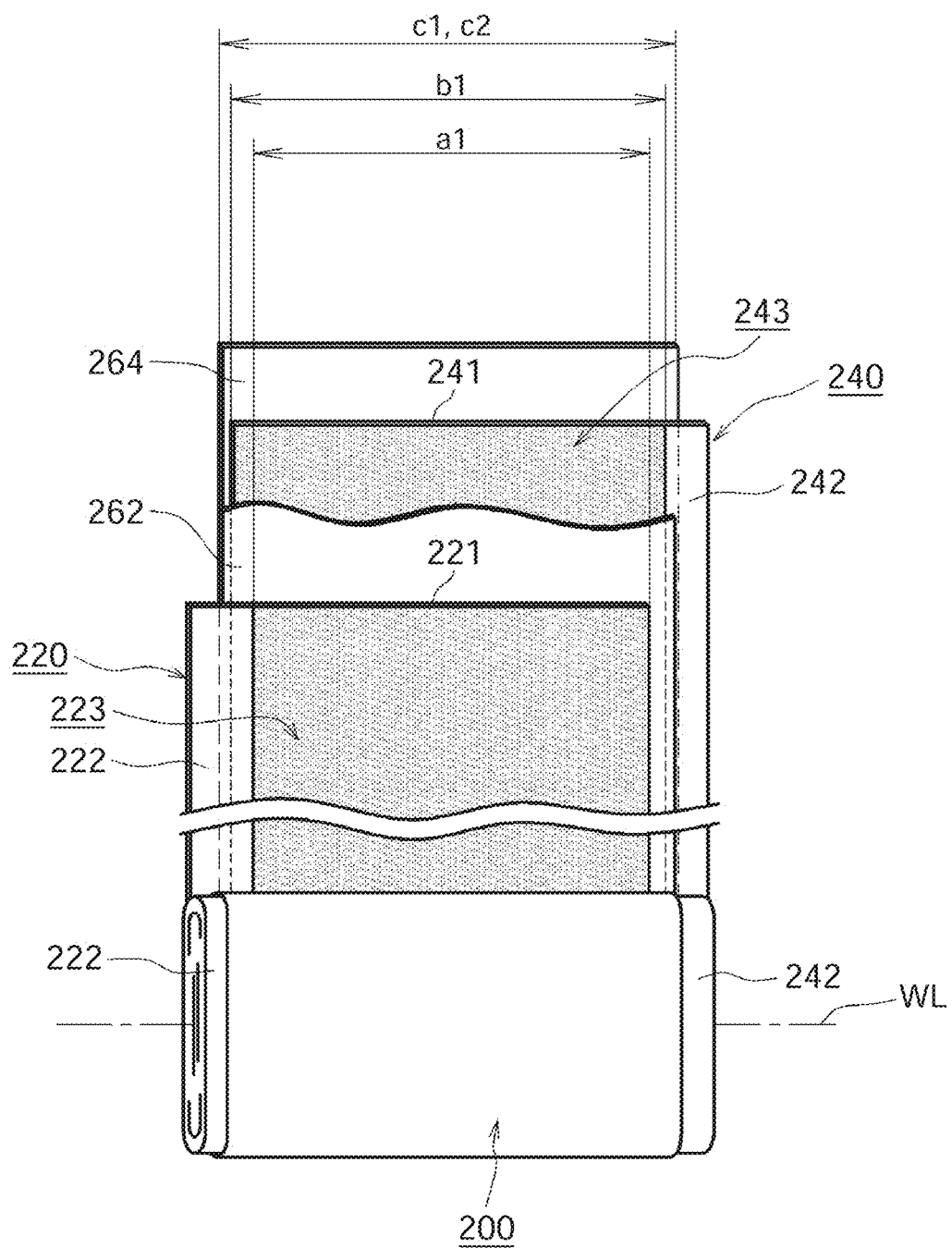
FIG. 2 is a view illustrating a wound electrode assembly according to the embodiment of the present invention.

FIG. 1 is a sectional view of a lithium-ion secondary battery 100 according to an embodiment of the present invention. FIG. 2 is a view illustrating a wound electrode assembly 200 mounted in the lithium-ion secondary battery 100.

The lithium-ion secondary battery 100 according to the embodiment of the present invention is constructed in a flat square battery case (that is, exterior container) 300 as illustrated in FIG. 1. In the lithium-ion secondary battery 100, as illustrated in FIG. 2, a flat wound electrode assembly 200 and a liquid-phase electrolyte (electrolytic liquid) (not illustrated) are accommodated in the battery case 300.

The battery case 300 is configured to include a case body 320 having a box shape (that is, a rectangular parallelepiped cuboidal shape with a bottom) in which one end (corresponding to an upper end portion in a typical use state of the battery 100) thereof has an opening, and an opening sealing plate (cover) 340 formed of a rectangular plate member that is attached to the opening and blocks the opening.

The material of the battery case 300 is not particularly limited as long as the material can be used in a sealed battery in the related art. The battery case 300 primarily made of a metal material which is lightweight and has good thermal conductivity is preferable, and as the metal material thereof, aluminum is exemplified.

As illustrated in FIG. 1, a positive electrode terminal 420 for external connection and a negative electrode terminal 440 are formed in the opening sealing plate 340. Between the two terminals 420,440 of the opening sealing plate 340, a thin safety valve 360, which is configured to release the internal pressure of the battery case 300 in a case where the internal pressure increases to a predetermined level or higher, and a liquid injection port 350 are formed. In addition, in FIG. 1, the liquid injection port 350 is sealed by a sealing material 352 after a liquid is injected.

As illustrated in FIG. 2, the wound electrode assembly 200 includes a long sheet-like positive electrode (positive electrode sheet 220), a long sheet-like negative electrode (negative electrode sheet 240) which is similar to the positive electrode sheet 220, and a total of two long sheet-like separators (separators 262,264).

The positive electrode sheet 220 includes a strip-like positive electrode collector 221 and a positive active material layer 223. As the positive electrode collector 221, for example, an appropriate metal foil for the positive electrode may be used. In this embodiment, an aluminum foil is used as the positive electrode collector 221. A non-coated portion 222 is set along the edge portion of one side of the positive electrode collector 221 in the width direction thereof. In the illustrated example, the positive active material layer 223 is held in both surfaces of the positive electrode collector 221 excluding the non-coated portion 222 set in the positive electrode collector 221. In the positive active material layer 223, the above-described positive active material (composite oxide) particles, a conductive material, and a binder are contained.

As the conductive material, for example, a carbon material such as carbon powder and carbon fiber is exemplified. As the conductive material, one type selected from the conductive materials may be singly used, or two or more types thereof may also be used in combination. As the carbon powder, various types of carbon black (for example, acetylene black, oil furnace black, graphitized carbon black, carbon black, graphite, and Ketjen black) carbon powder such as graphite powder may be used.

In addition, the binder allows the positive active material particles contained in the positive active material layer and the particles of the conductive material to be bound together, or allows such particles and the positive electrode collector 221 to be bound together. As the binder, a polymer which is dissolvable or dispersible in the solvent that is used may be used. For example, for a positive electrode mixture composition which uses an aqueous solvent, a water-soluble or water-dispersible polymer such as a cellulosic polymer (carboxymethyl cellulose (CMC), hydroxypropyl methylcellulose (HPMC), or the like), rubber (vinyl acetate copolymer, a styrene-butadiene copolymer (SBR), an acrylic acid-modified SBR resin (SBR latex), or the like) may be preferably employed. In addition, for a positive electrode mixture composition which uses a non-aqueous solvent, a polymer (polyvinylidene fluoride (PVDF), polyvinylidene chloride (PVDC), polyacrylonitrile (PAN), or the like) may be preferably employed.

The positive active material layer 223 is formed, for example, by producing a positive electrode mixture in which the above-described positive active material particles, the conductive material, and the binder are mixed with each other in a solvent into a paste form (slurry form), applying the mixture to the positive electrode collector 221, and drying and rolling the resultant. At this time, as the solvent of the positive electrode mixture, any one of an aqueous solvent and a non-aqueous solvent may be used. As an appropriate example of the non-aqueous solvent, N-methyl-2-pyrrolidone (NMP) may be employed. The polymer material exemplified as the binder may be used for the purpose of exhibiting, in addition to the function of the binder, the function of a thickener of the positive electrode mixture or the function of other additives.

As illustrated in FIG. 2, the negative electrode sheet 240 includes a strip-like negative electrode collector 241 and a negative active material layer 243. As the negative electrode collector 241, for example, an appropriate metal foil for the negative electrode may be used. In this embodiment, a strip-like copper foil having a thickness of approximately 10 µm is used as the negative electrode collector 241. A non-coated portion 242 is set along the edge portion of one side of the negative electrode collector 241 in the width direction thereof. The negative active material layer 243 is held in both surfaces of the negative electrode collector 241 excluding the non-coated portion 242 set in the negative electrode collector 241. In the negative active material layer 243, negative active material particles are contained. Here, the negative active material layer 243 is formed by applying a negative electrode mixture containing the negative active material particles to the negative electrode collector 241, drying the resultant, and pressing the resultant into a predetermined thickness.

As the negative active material particles contained in the negative active material layer 243, one type or two or more types of materials used for the lithium-ion secondary battery in the related art may be used without any particular limitations. As an appropriate example, a carbon-based material such as graphite carbon and amorphous carbon, lithium transition-metal oxides, lithium transition-metal nitrides, and the like may be employed.

As illustrated in FIG. 2, the separators 262,264 are members that separate the positive electrode sheet 220 and the negative electrode sheet 240 from each other. In this example, the separators 262,264 are formed of a strip-like sheet material having a predetermined width with a plurality of fine holes. As the separators 262,264, for example, a separator having a single-layer structure formed of a porous polyolefin-based resin or a separator having a layered structure may be used. In this example, as illustrated in FIG. 2, a width b1 of the negative active material layer 243 is slightly greater than a width a1 of the positive active material layer 223. Furthermore, widths c1 and c2 of the separators 262,264 are slightly greater than the width b1 of the negative active material layer 243 (c1, c2>b1>a1).

In addition, in the example illustrated in FIG. 2, the separators 262,264 are formed of a sheet-like member. The separators 262,264 may be members that allow the movement of the non-aqueous electrolyte while insulating the positive active material layer 223 and the negative active material layer 243 from each other. Therefore, the separators 262,264 are not limited to the sheet-like members. Instead of the sheet-like members, for example, the separators 262,264 may be formed of layers of particles which are formed on the surface of the positive active material layer 223 or the negative active material layer 243 and have insulating properties. Here, the particles having insulating properties may be formed of an inorganic filler (for example, a filler of metal oxides, metal hydroxides, or the like) having insulating properties or resin particles (for example, particles of polyethylene, polypropylene, or the like) having insulating properties.

As the electrolyte (non-aqueous electrolyte), the same electrolyte as the non-aqueous electrolyte used in the lithium-ion secondary battery of the related art may be used without any particular limitations. The non-aqueous electrolyte typically has a composition that contains a support salt in an appropriate non-aqueous solvent. As the non-aqueous solvent, for example, one type or two or more types selected from the group consisting of ethylene carbonate, propylene carbonate, dimethyl carbonate, diethyl carbonate, ethyl methyl carbonate, 1,2-dimethoxyethane, 1,2-diethoxyethane, tetrahydrofuran, and 1,3-dioxolan may be used. As the support salt, for example, lithium salts such as $LiPF_6$, $LiBF_4$, $LiAsF_6$, $LiCF_3SO_3$, $LiC_4F_9SO_3$, $LiN(CF_3SO_2)_2$, and $LiC(CF_3SO_2)_3$ may be used. As an example, a non-aqueous electrolyte which contains $LiPF_6$ at a concentration of about 1 mol/L in a mixed solvent (for example, a mass ratio of 1:1) of ethylene carbonate and diethyl carbonate may be employed.

In this embodiment, as illustrated in FIG. 2, the wound electrode assembly 200 is folded in a flat manner in a direction perpendicular to a winding axis WL. In the example illustrated in FIG. 2, the non-coated portion 222 of the positive electrode collector 221 and the non-coated portion 242 of the negative electrode collector 241 are exposed in a spiral form on both sides of the separators 262,264. In this embodiment, as illustrated in FIG. 1, the intermediate portion of the non-coated portion 222 (242) is gathered and is welded to collector tabs 420a, 440a of the electrode terminals 420,440 (internal terminals) disposed inside the battery case 300.

Hereinafter, several examples related to the present invention will be described. However, the examples are not intended to limit the present invention to the examples.

Lithium acetate dihydrate as a lithium source, nickel acetate tetrahydrate as a nickel source, manganese acetate tetrahydrate as a manganese source, pentaethoxyniobium as a niobium source, and magnesium acetate tetrahydrate as a magnesium source were dissolved in pure water to achieve a Li:Ni:Mn:Mg:Nb molar ratio of 33.33:15.83:47.5:1.67:1.67, thereby preparing a raw mixed liquid. Next, nitric acid was added to the raw mixed liquid to adjust the pH thereof to 3, and thereafter the resultant was heated to 80° C. for 12 hours while being stirred at an appropriate speed, thereby obtaining a gel-like precursor. The precursor was baked at 250° C. in the air atmosphere, cooled, crushed, and further baked at 850° C., thereby obtaining composite oxide particles (positive active material) of Example 1 of which the entire composition is expressed by $Li(Ni_{0.475}Mn_{1.35}Nb_{0.05}Mg_{0.05})O_4$.

By changing the raw mixed liquid to have a Li:Ni:Mn:Nb:Mg molar ratio of 33.33:16.67:45:3.33:1.67, composite oxide particles of Example 2 of which the entire composition is expressed by $Li(Ni_{0.5}Mn_{1.35}Nb_{0.1}Mg_{0.05})O_4$ were obtained. The other processes were performed in the same order as that in Example 1.

Composite oxide particles (positive active material) of Example 3 were obtained in the same order as that in Example 1 except that niobium oxide was used as the niobium source in the raw mixed liquid.

Composite oxide particles (positive active material) of Example 4 were obtained in the same order as that in Example 2 except that niobium oxide was used as the niobium source in the raw mixed liquid.

By changing the raw mixed liquid to have a Li:Ni:Mn molar ratio of 33.33:16.67:50 without adding the niobium source and the magnesium source, composite oxide particles of Comparative Example of which the entire composition is expressed by $Li(Ni_{0.5}Mn_{1.5})O_4$ were obtained. The other processes were performed in the same order as that in Example 1.

Figure 3:
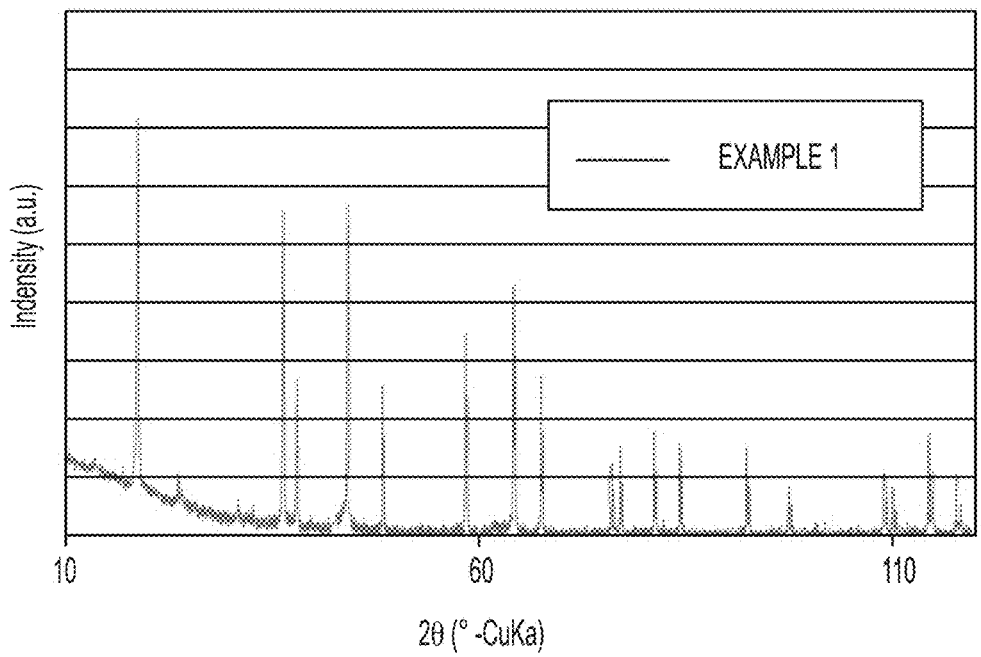
FIG. 3 is a view illustrating an X-ray diffraction pattern of Example 1.
Figure 4:
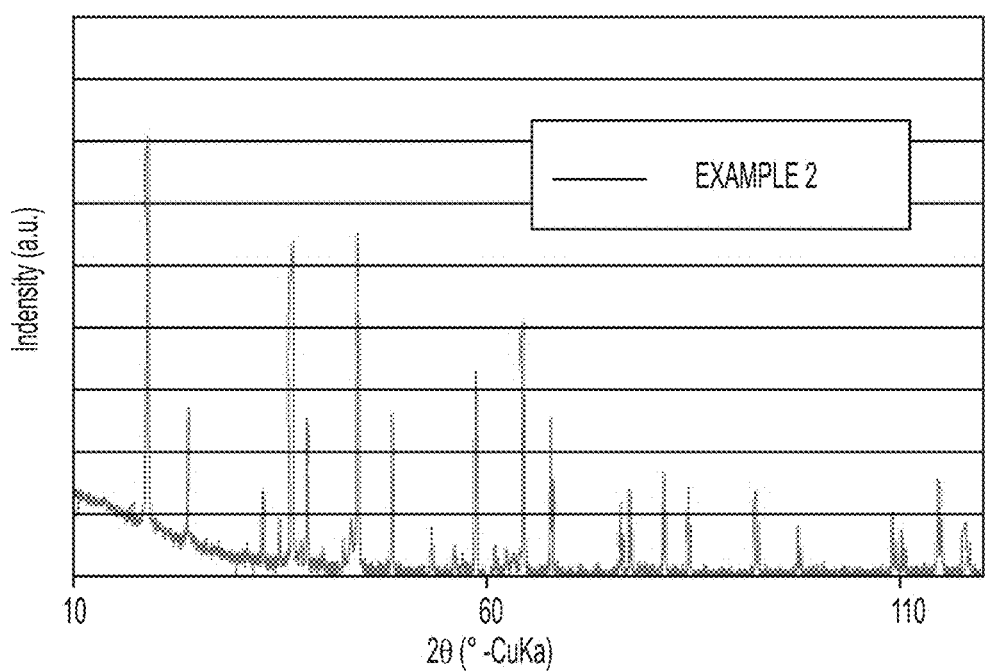
FIG. 4 is a view illustrating an X-ray diffraction pattern of Example 2.
Figure 5:
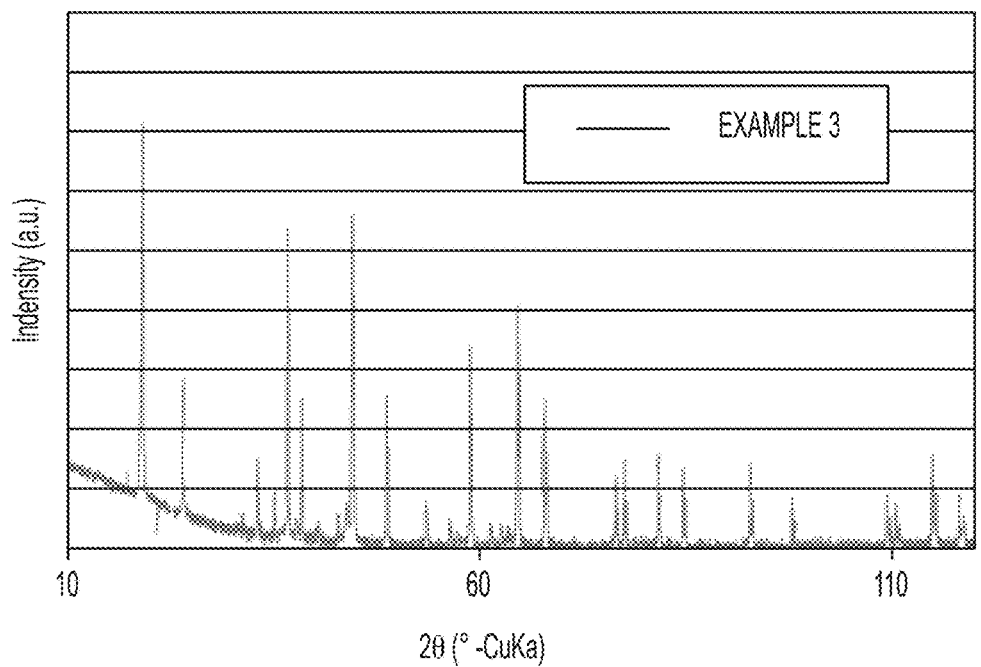
FIG. 5 is a view illustrating an X-ray diffraction pattern of Example 3.
Figure 6:
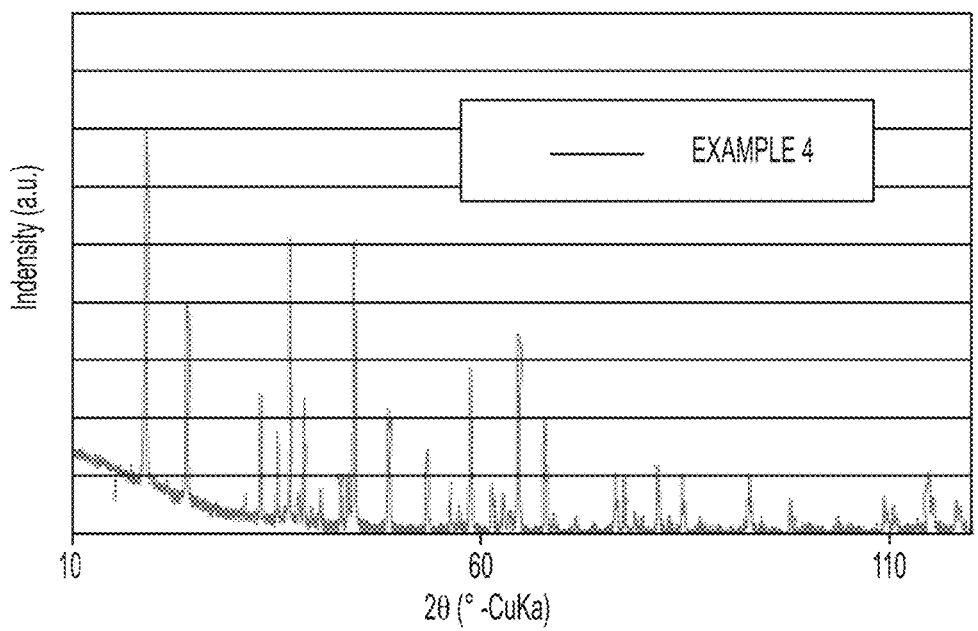
FIG. 6 is a view illustrating an X-ray diffraction pattern of Example 4.

Powder X-ray diffraction measurement of the composite oxide particles obtained in each example was performed. The measurement was performed in a range of 2θ=10° to 120° at 25° C. by using CuKα (a wavelength of 0.154 nm) as the X-ray source. The results are illustrated in FIG. 3 (Example 1), FIG. 4 (Example 2), FIG. 5 (Example 3), FIG. 6 (Example 4), and FIG. 7 (Comparative Example). In addition, an enlarged diffraction pattern at 2θ=23° to 25° in each example is illustrated in FIG. 8.

Figure 7:
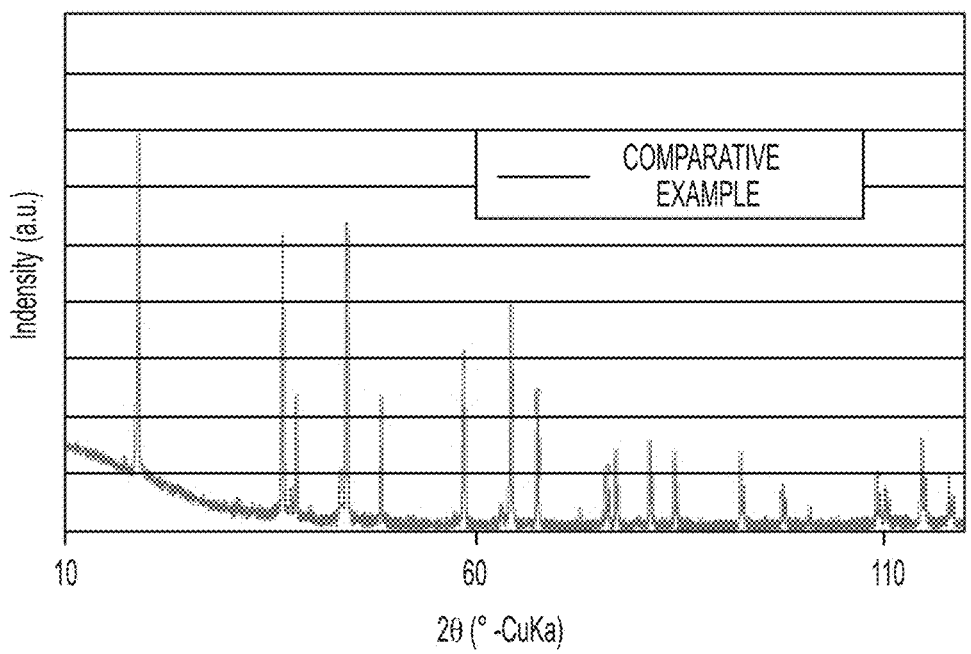
FIG. 7 is a view illustrating an X-ray diffraction pattern of Comparative Example.
Figure 8:
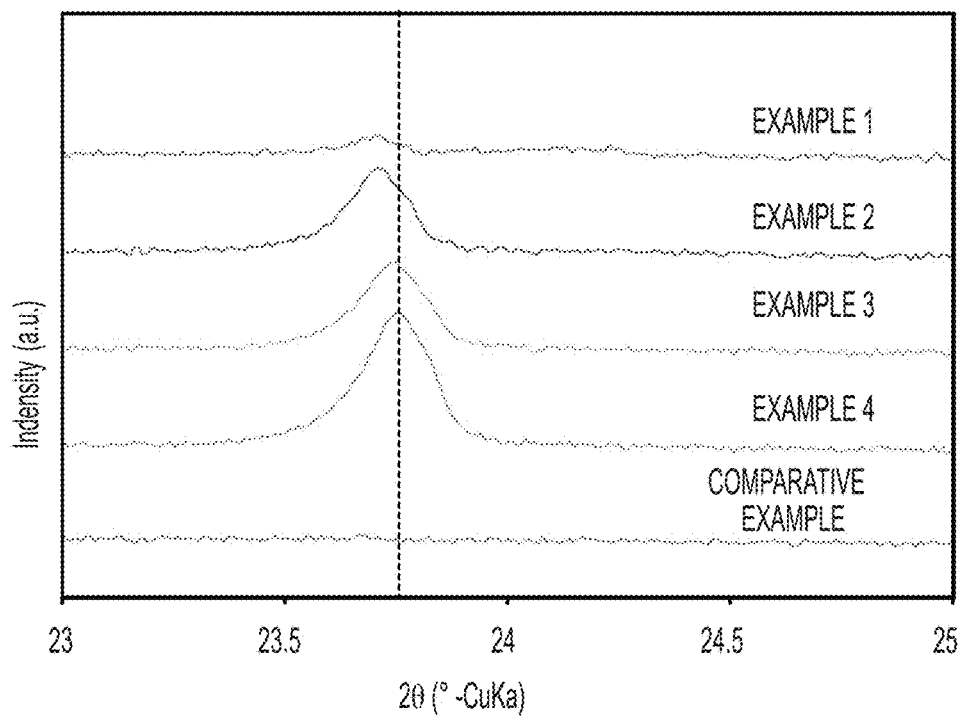
FIG. 8 is a view for comparison between the X-ray diffraction patterns of Examples.

As illustrated in FIG. 7, in Comparative Example, only peaks attributed to the spinel type crystal structure of $Li(Ni_{0.5}Mn_{1.5})O_4$ were observed. Contrary to this, as illustrated in FIGS. 3 to 6, in Examples 1 to 4, in addition to the peaks attributed to the spinel type crystal structure, peaks attributed to the crystal structure of $LiNbO_3$ were observed at positions at 2θ of about 23.5°, 32.8°, 34.8°, 42.5°, and 53.1°. From the results, in Examples 1 to 4, it was confirmed that the spinel type crystal structure and the crystal phase of $LiNbO_3$ were present while being mixed with each other. Here, as illustrated in FIG. 8, in Examples 1 and 2, the peaks of LiNbO$_3$ were shifted toward the lower angle side in Examples 3 and 4. From this, it is thought that in Examples 1 and 2, LiMg$_{1-x}$Nb$_x$O$_3$ (0<x<1) having a greater lattice constant than that of LiNbO$_3$ was generated.

Figure 9:
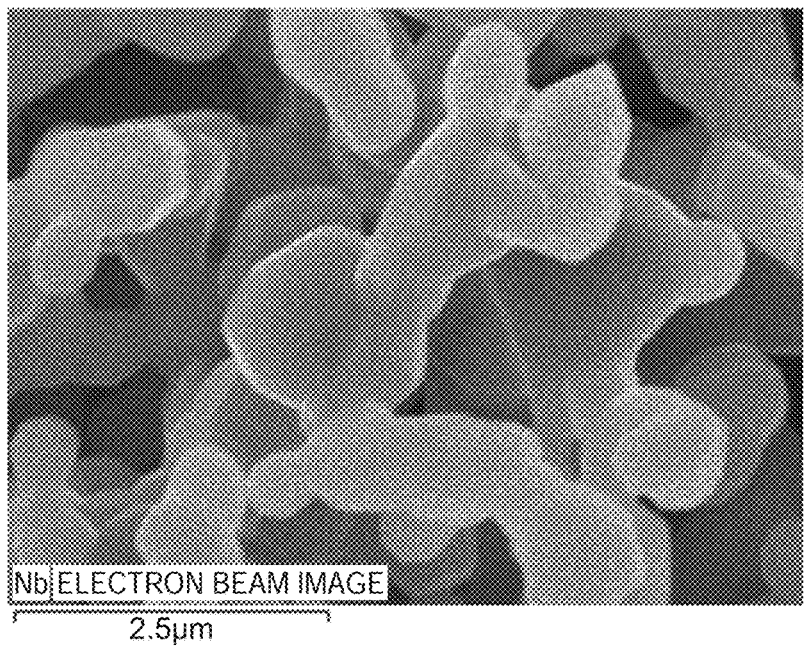
FIG. 9 is an SEM image illustrating Nb mapping results using SEM-EDX.
Figure 10:
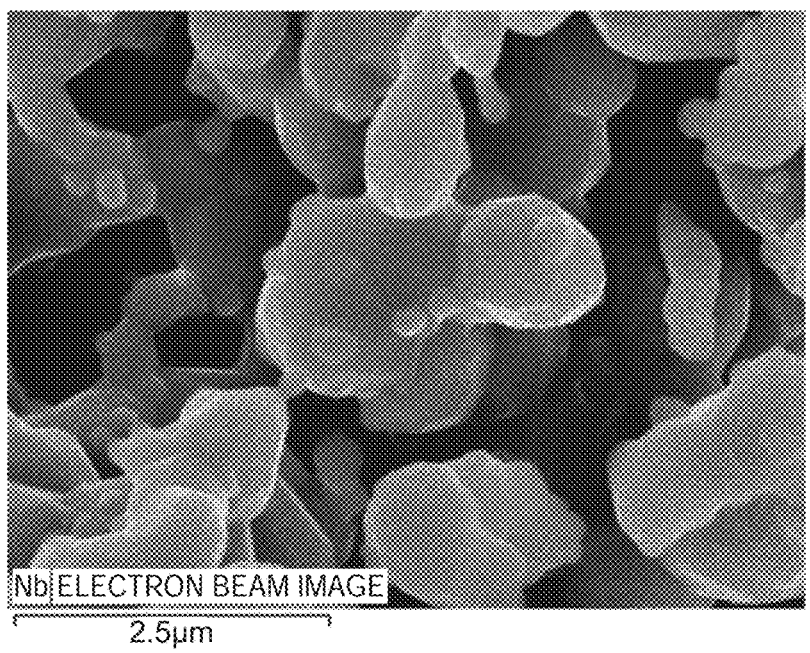
FIG. 10 is an SEM image illustrating Nb mapping results using SEM-EDX.

In addition, Nb mapping of the composite oxide particles obtained in each example was performed using SEM-EDX. The results are shown in FIG. 9 (Example 1) and FIG. 10 (Example 2). In the figures, parts with a darker shade indicate points where Nb is present. As illustrated in FIGS. 9 and 10, it was confirmed that in Examples 1 and 2, Nb covered the surface of the composite oxide particles (here, primary particles). From the results, it was confirmed that the crystal phase of LiNbO$_3$ or LiMg$_{1-x}$Nb$_x$O$_3$ was segregated and located in the surface layer portion of the composite oxide particles.

The positive active material particles obtained as described above, acetylene black (AB: HS-100 made by DENKI KAGAKU KOGYO KABUSHIKI KAISHA) as a conductive material, and polyvinylidene fluoride (PVDF: KF Polymer made by KUREHA CORPORATION) as a binder were kneaded with N-methylpyrrolidone (NMP) so as to achieve a materials mass ratio of 85:10:5, thereby preparing a paste-like composition (positive electrode paste) for forming a positive active material layer. The positive electrode paste was applied onto aluminum foil (positive electrode collector) to achieve a coating amount (a coating amount in terms of solid content, that is, the dry mass of a positive active material layer) of 6 mg/cm$^2$, and was dried to form a positive active material layer. Next, the positive active material layer was pressed to a thickness of 41 μm, thereby producing a positive electrode sheet.

By punching the positive electrode sheet into a circle having a diameter of 16 mm, a positive electrode was produced. The positive electrode (working electrode), graphite (with a diameter of 19 mm) as a negative electrode (counter electrode), and a separator (a porous PP (polypropylene) sheet having a diameter of 22 mm was used) were assembled into a stainless container together with a non-aqueous electrolyte, thereby constructing a coin cell battery having a diameter of 20 mm and a thickness of 3.2 mm (2032 type). As the non-aqueous electrolyte, an electrolyte which contains LiPF$_6$ as the support salt at a concentration of about 1 mol/L in a mixed solvent of ethylene carbonate (EC) and ethyl methyl carbonate (EMC) contained at a volume ratio of 3:7 was used. Next, by performing conditioning treatments thereon, a lithium-ion secondary battery for evaluation was constructed.

The initial capacity and the capacity retention rate after cycles occurred were evaluated on the lithium-ion secondary battery in each example for evaluation tests.

The initial capacity of the lithium-ion secondary battery for evaluation in each example was measured through the following procedures 1 to 4.

Procedure 1: After the battery reached 4.9 V through ⅓C constant current discharge at 25° C., the battery was disconnected for 10 seconds.

Procedure 2: After the battery reached 3.5 V through ⅓C constant current discharge, the battery was disconnected for 10 seconds.

Procedure 3: After the battery reached 4.9 V through 1C constant current charge, the battery was charged for 2.5 hours through constant voltage charge and was thereafter disconnected for 10 seconds.

Procedure 4: After the battery reached 3.5 V through 1C constant current discharge, the battery was discharged for 2.5 hours through constant voltage discharge and was thereafter disconnected for 10 seconds.

Here, the discharge capacity (CCCV discharge capacity) during discharge from the constant current discharge to the constant voltage discharge in the procedure 4 was referred to as an "initial capacity".

After the initial charge, a cycle test was performed by applying a charge/discharge pattern in which charge and discharge were repeated at 2C on the battery of each example. Specifically, a charge/discharge cycle in which the battery was charged to 4.9 V at a constant current of 2C at 60° C. and was thereafter discharged to 3.5 V at a constant current of 2C was continuously performed 100 times. In addition, the capacity retention rate after cycles occurred was calculated by (discharge capacity in 100$^{th}$ cycle/discharge capacity in 1$^{st}$ cycle)×100.

For each example, the results of the tests are shown in Table 1.

TABLE 1

|  | Entire composition | Nb source | Initial capacity (mAh/g) | Capacity retention rate after 100 cycles (%) |
|---|---|---|---|---|
| Example 1 | Li(Ni$_{0.475}$Mn$_{1.35}$Nb$_{0.05}$Mg$_{0.05}$)O$_4$ | Pentaethoxyniobium | 104.3 | 63.5 |
| Example 2 | Li(Ni$_{0.5}$Mn$_{1.35}$Nb$_{0.1}$Mg$_{0.05}$)O$_4$ | Pentaethoxyniobium | 91.75 | 60.12 |
| Example 3 | Li(Ni$_{0.475}$Mn$_{1.35}$Nb$_{0.05}$Mg$_{0.05}$)O$_4$ | Niobium oxide | 92.7 | 61.5 |
| Example 4 | Li(Ni$_{0.5}$Mn$_{1.35}$Nb$_{0.1}$Mg$_{0.05}$)O$_4$ | Niobium oxide | 77.58 | 55.05 |
| Comparative Example | Li(Ni$_{0.5}$Mn$_{1.5}$)O$_4$ | — | 77.3 | 51.06 |

As shown in Table 1, in Examples 1 to 4 in which the composite oxide particles containing the crystal phase of LiNbO$_3$ or LiMg$_{1-x}$Nb$_x$O$_3$ in the surface layer portion therein were used as the positive active material, the capacity retention rate after cycles occurred was higher and the durability was more excellent compared to those in Comparative Example. From the results, it was confirmed that cycle characteristics could be enhanced by allowing the crystal phase of LiNbO$_3$ or LiNi$_{1-x}$Nb$_x$O$_3$ to be segregated and to be located in the surface layer portion of the composite oxide particles. In addition, in a case of comparison under the same composition, in Example 1 in which the crystal phase of LiMg$_{1-x}$Nb$_x$O$_3$ was segregated, the initial capacity was higher and the cycle characteristics were more excellent compared to those in Example 3 in which the crystal phase of LiNbO$_3$ was segregated. In addition, in Example 2 in which the crystal phase of LiMg$_{1-x}$Nb$_x$O$_3$ was segregated, the initial capacity was higher and the cycle characteristics were more excellent compared to those in Example 4 in which the crystal phase of LiNbO$_3$ was segregated. It is assumed that LiMg$_{1-x}$Nb$_x$O$_3$ has a higher Li ionic conductivity than that of LiNbO$_3$, and it is though that the segregation of a small amount of LiMg$_{1-x}$Nb$_x$O$_3$ contributes to the enhancement of the battery characteristics.

The embodiment of the present invention and Examples described above in detail are merely examples and may be appropriately modified and changed.

According to the embodiment of the present invention and Examples, the lithium-ion secondary battery shows excellent performance as described above and thus can be used as a lithium-ion secondary battery for various applications. For example, the lithium-ion secondary battery can be appropriately used as the power source for a motor mounted in a vehicle such as an automobile. The lithium-ion secondary battery may also be used in a battery pack form in which a plurality of lithium-ion secondary batteries are connected in series and/or in parallel. Therefore, according to the technique disclosed herein, a vehicle (typically an automobile, particularly an automobile provided with a motor such as a hybrid vehicle, an electric vehicle, or a fuel cell vehicle) provided with the lithium-ion secondary battery (may also be in a battery pack form) as the power source can be provided.

Although the lithium-ion secondary battery is exemplified herein, the secondary battery of the present invention can be applied to the structure of a non-aqueous electrolyte secondary battery other than the lithium-ion secondary battery as long as the secondary battery is not particularly explicitly limited.

What is claimed is:

1. A non-aqueous electrolyte secondary battery comprising:
a positive electrode containing a positive active material;
a negative electrode; and
a non-aqueous electrolyte, wherein
the positive active material contains composite oxide particles having a spinel structure including Ni and Mn,
the composite oxide particles contain at least one of a crystal phase of $LiNbO_3$ or a crystal phase of $LiMg_{1-x}Nb_xO_3$,
x is higher than 0 and lower than 1, and
the crystal phase is segregated and located in a surface layer portion of the composite oxide particles.

2. The non-aqueous electrolyte secondary battery according to claim 1, wherein
the spinel structure includes Ni, Mn, Nb, Mg, and Me,
Me is at least one metal element having a lower electronegativity than an electronegativity of Mn, and
the composite oxide particles primarily form the spinel structure.

3. The non-aqueous electrolyte secondary battery according to claim 2, wherein
a combination of the spinel structure and the crystal phase is expressed by General Formula (1) as follows:

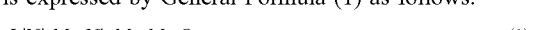

$LiNi_aMn_bNb_cMg_dMe_eO_4$ (1)

where a, b, c, d, and e in the General Formula (1) satisfy following conditions:

$0.4 \leq a \leq 0.6$ $1.2 \leq b \leq 1.6$ $0.02 \leq c \leq 0.1$ $0.02 \leq d \leq 0.1$ $0 \leq e \leq 0.1$ $1.8 \leq (a+b+c+d+e) \leq 2.2$.

4. The non-aqueous electrolyte secondary battery according to claim 3, wherein
Me is at least one metal element selected from the group consisting of Na, K, and Ca.

5. The non-aqueous electrolyte secondary battery according to claim 4, wherein
e is 0.03 or higher and 0.05 or lower.

6. The non-aqueous electrolyte secondary battery according to claim 1, wherein
the crystal phase contains $LiMg_{1-x}Nb_xO_3$.

7. The non-aqueous electrolyte secondary battery according to claim 6, wherein
the crystal phase consists of $LiMg_{1-x}Nb_xO_3$.

8. The non-aqueous electrolyte secondary battery according to claim 6, wherein
$LiMg_{1-x}Nb_xO_3$ has a crystal structure of a trigonal crystal system that belongs to a space group R3C.

9. The non-aqueous electrolyte secondary battery according to claim 6, wherein
x is higher than 0 and equal to or lower than 0.5.

10. The non-aqueous electrolyte secondary battery according to claim 9, wherein
x is 0.001 or higher and 0.3 or lower.

11. The non-aqueous electrolyte secondary battery according to claim 10, wherein
x is 0.005 or higher and 0.2 or lower.

12. The non-aqueous electrolyte secondary battery according to claim 11, wherein
x is 0.01 or higher and 0.1 or lower.

13. The non-aqueous electrolyte secondary battery according to claim 1, wherein
the crystal phase is a film that is scattered in the surface layer portion of the composite oxide particles.

14. The non-aqueous electrolyte secondary battery according to claim 6, wherein
the crystal phase has a peak at a position shifted toward a lower angle side by 0.05° to 0.1° inclusive from a predetermined peak between 23.5° and 24.0° in an X-ray diffraction pattern measured by a powder X-ray diffraction analyzer, the predetermined peak being included among peaks attributed to the crystal phase of $LiNbO_3$.

* * * * *